June 10, 1924.
F. W. BARTLEY
VALVE
Filed Dec. 28, 1921
1,497,473
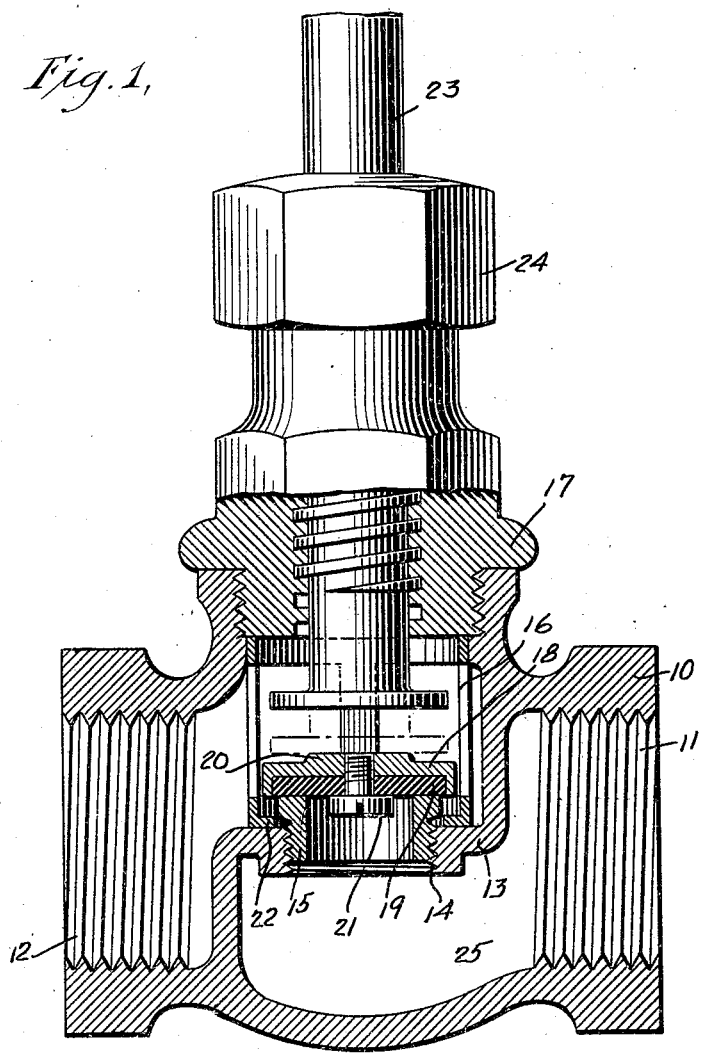
Fig. 1,
Fig. 2,
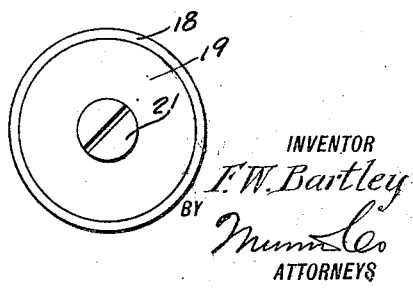
Fig. 3.
WITNESSES
Edw. Thorpe
E. W. Savage
INVENTOR
F. W. Bartley
BY
Munn & Co
ATTORNEYS Patented June 10, 1924.

1,497,473

UNITED STATES PATENT OFFICE.

FRANK W. BARTLEY, OF NEWBERRY, PENNSYLVANIA.

VALVE.

Application filed December 28, 1921. Serial No. 525,310.

*To all whom it may concern:*

Be it known that I, FRANK W. BARTLEY, a citizen of the United States, and a resident of Newberry, in the county of Lycoming and State of Pennsylvania, have invented new and useful Improvements in Valves, of which the following is a full, clear, and exact description.

This invention relates to valves and consists of certain improvements in their construction.

The general object of the invention is the provision of a valve having a removable valve seat and a valve disk for co-operating with the valve seat provided with a seating disk which gives a tight closure.

A further object of this invention is the provision of a valve disk detached from the valve stem and slidably mounted in a cage located in the valve casing so that the valve disk may be removed by taking the cage out of the casing.

These and other objects of the invention will be more clearly understood from the following detailed description and accompanying drawings.

Figure 1 is a vertical cross section of the valve.

Figure 2 is a perspective view of the cage; and

Figure 3 is a bottom plan view of the valve disk.

Referring to the above-mentioned figures, a valve casing 10 is provided with two internal threads 11 and 12, one at each end, for engaging the pipes. A valve bridge 13 is threaded at 14 and serves as a valve seat support. The valve seat 15 has its lower end threaded and is removably mounted in the valve support or bridge 13. Interposed between the valve seat support and the bonnet 17 is a cage 16. This cage extends over the upper portion of the valve seat and is concentric with it. A valve disk 18 is slidably mounted in the cage 16 and rests on the valve seat 15. This valve disk has a seat member 19 fixed to its lower face and a reinforcing member 20 integral with its upper face. The seat disk 19, which is preferably made of some composition usually softer than the valve seat, is attached to the disk by means of a screw 21. The cage 16 has an annular flange 22 extending inward. The inner diameter of this flange is smaller than the diameter of the valve disk which is slidably mounted in the cage. Adjustably mounted in the bonnet 17 is a valve stem 23 which is separate from the valve disk 18 but which serves to force the latter into position on the valve seat 15. A packing nut 24 is mounted on the bonnet 17.

In the operation of this valve, when it is desired to close it, the valve stem is screwed downward in the bonnet 17 bringing it into contact with the valve disk and forcing the latter into position on the valve seat 15. The seat disk 19 contacts with the valve seat and makes a tight closure. In order to open the valve, the valve stem is raised and the pressure upon the liquid or the like in chamber 25 raises the valve disk 18 thus giving a passage through the valve. The valve disk 18, being free from the valve stem 23, serves as a check valve in case the pressure on the liquid reverses in direction.

The valve seat when worn may be easily removed for grinding or replacement. The valve disk 18, which is of greater diameter than the inner diameter of the flange 22 of the cage, may be removed by the removal of the cage. The advantage of having the valve disk 18 located in the cage is that it is easy to remove and that there is no possibility of losing it through the outlet opening. This construction of the valve allows the valve stem to be raised so that its base contacts tightly with the lower part of the bonnet thus making it possible to pack the packing nut 24 under pressure.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims.

1. A valve comprising a valve casing, a bridge having an opening extending therethrough formed in the casing, a valve seat removably mounted on the bridge, a cage mounted in the valve casing and carried by the bridge, a valve disk slidably mounted in the cage, means provided on the bottom of the cage for preventing the passage of the valve disk therethrough, and means mounted in the valve casing for forcing the valve disk into position on the valve seat.

2. In a valve including a casing, a bridge formed in the casing, and a valve seat mounted in the bridge, a valve disk, means for removably mounting the valve disk in the casing in alinement with the valve seat, comprising a skeleton cage resting on the bridge, slidably engaging the valve disk, and provided on the bottom with means for engaging the valve disk to prevent the passage of the latter therethrough.

3. As a new article of manufacture, a valve comprising a valve casing having a valve seat support integral therewith, a valve seat removably mounted in the valve seat support, a bonnet carried by the valve casing, a cage removably interposed between the valve seat support and the bonnet concentric with the valve seat and fitting over it, a flange integral with the bottom of the cage and extending inward, a valve disk having a seating disk fixed to its lower face and of such a size that it cannot pass through the opening in the bottom of the cage, slidably mounted in the latter, and a valve stem for forcing the valve into contact with the valve seat adjustably mounted in the bonnet.

FRANK W. BARTLEY.